United States Patent
Shiraishi

(10) Patent No.: US 7,324,150 B2
(45) Date of Patent: Jan. 29, 2008

(54) IMAGING APPARATUS FOR DETERMINING A FOCUSED STATE

(75) Inventor: Kenji Shiraishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 911 days.

(21) Appl. No.: 10/359,691

(22) Filed: Feb. 7, 2003

(65) Prior Publication Data

US 2003/0146988 A1    Aug. 7, 2003

(30) Foreign Application Priority Data

Feb. 7, 2002    (JP) .............................. 2002-030263

(51) Int. Cl.
*H04N 5/232*    (2006.01)

(52) U.S. Cl. ...................... 348/345; 348/353; 348/354

(58) Field of Classification Search ................ 348/345, 348/349, 353, 354
See application file for complete search history.

(56) References Cited

U.S. PATENT DOCUMENTS

| | | | |
|---|---|---|---|
| 5,751,354 A * | 5/1998 | Suzuki et al. | 348/349 |
| 6,130,417 A | 10/2000 | Hashimoto | |
| 6,181,378 B1 * | 1/2001 | Horie et al. | 348/353 |
| 6,249,317 B1 * | 6/2001 | Hashimoto et al. | 348/364 |
| 2003/0146988 A1 | 8/2003 | Shiraishi | |
| 2005/0083428 A1 * | 4/2005 | Ohkawara | 348/345 |

FOREIGN PATENT DOCUMENTS

| | | |
|---|---|---|
| EP | 0 479 671 | 4/1992 |
| JP | 39-005265 | 4/1964 |
| JP | 2002-258344 | 9/2002 |
| JP | 2003-207712 | 7/2003 |

OTHER PUBLICATIONS

U.S. Appl. No. 10/359,691, filed Feb. 7, 2003, Shiraishi.
U.S. Appl. No. 10/636,712, filed Aug. 8, 2003, Shinohara et al.
U.S. Appl. No. 10/637,502, filed Aug. 11, 2003, Shiraishi.
U.S. Appl. No. 10/764,438, filed Jan. 27, 2004, Shiraishi et al.
U.S. Appl. No. 10/914,196, filed Aug. 10, 2004, Shiraishi.
U.S. Appl. No. 11/028,307, filed Jan. 4, 2005, Shiraishi.

* cited by examiner

*Primary Examiner*—Lin Ye
*Assistant Examiner*—Dillon Durnford-Geszvain
(74) *Attorney, Agent, or Firm*—Oblon, Spivak, McClelland, Maier & Neustadt, P.C.

(57) ABSTRACT

An imaging apparatus including: an imaging device; a focusing operation control; and a decision control for comparing an evaluation value obtained from present image data with an evaluation value obtained from last image data obtained when the focus system leans was located at focal position in a last focusing operation and for deciding whether or not a focused state where the focus system lens is focused is maintained, according to a focusing instruction manipulation before performing the focusing operation and without driving the focus system lens.

11 Claims, 2 Drawing Sheets

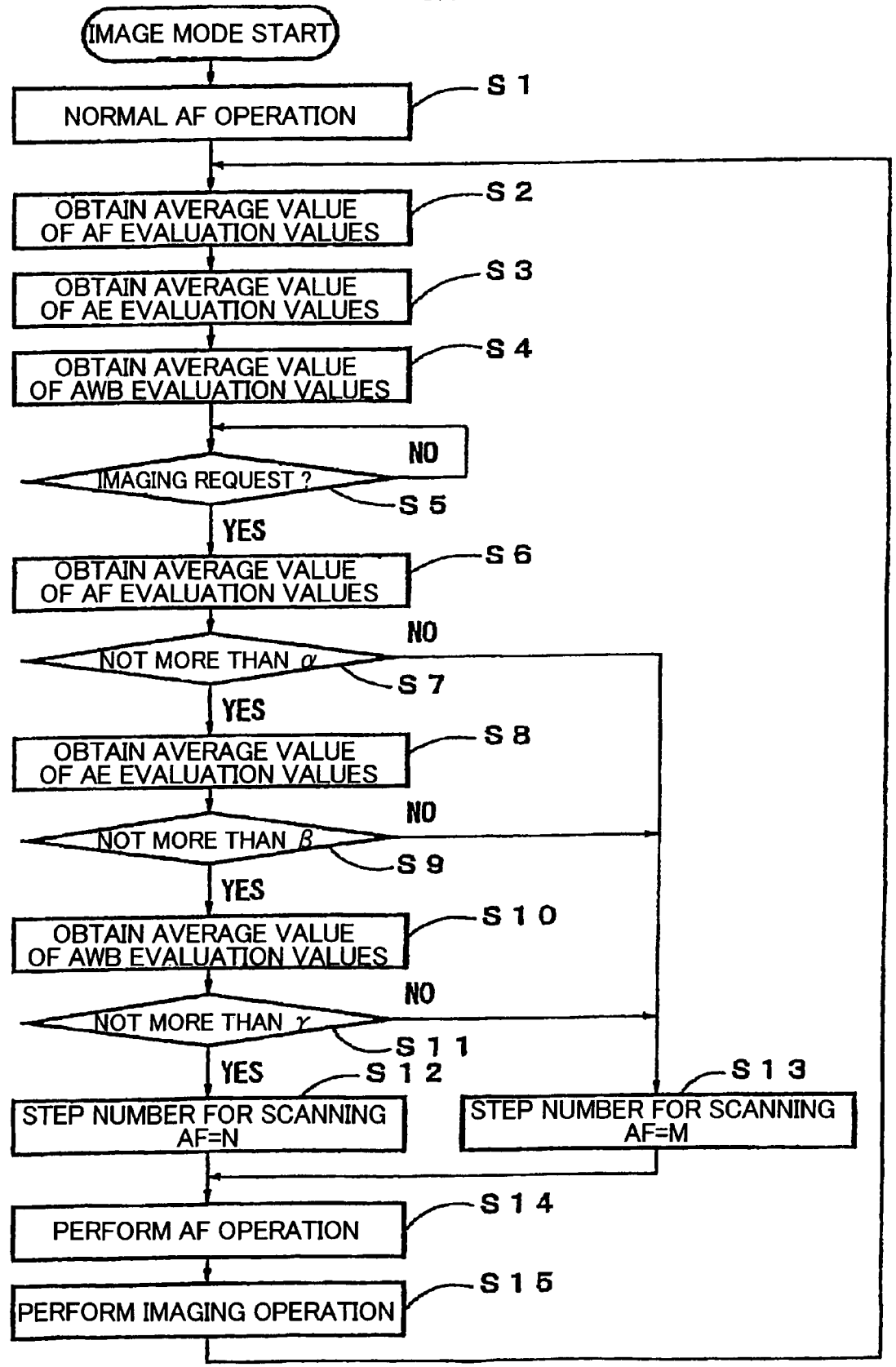

IMAGING APPARATUS FOR DETERMINING A FOCUSED STATE

BACKGROUND OF THE INVENTION

1. Field of the Invention

The present invention relates to an imaging apparatus, particularly relates to the imaging apparatus having function of automatic focus.

2. Description of the Related Art

Generally, the imaging apparatus such as a digital still camera has automatic focus (hereinafter referred to as "AF") having function adjusting automatically focus. Hill climbing control described in Japanese Patent Application Publication No. 39-5265 is widely used as the function. The hill climbing control is that an integral value of a high frequency component or brightness difference in adjacent pixels is calculated from image data obtained by an imaging element such as a CCD and the integral value is changed into an AF evaluation value showing a degree of the focus.

In the case of a focused state, because an edge portion of a subject is clear, the AF evaluation value becomes large, and in the case of an unfocused state, the AF evaluation value becomes small. An AF apparatus takes the AF evaluation value in order while the AF apparatus moves a lens from an infinite distance to a close distance, and the AF apparatus stops the lens at a focal position where the AF evaluation value becomes a maximum.

In the apparatus imaging a still image such as the digital still camera, generally the strict focus required compared with the apparatus imaging a dynamic picture image such as a video camera, so that focusing operation is performed for every imaging operation or the focusing operation is always repeated.

However, when the hill climbing control AF is performed for every imaging operation, there is a problem that release time lag between imaging start request manipulation of an operator and actual imaging performance occurs. When the focusing operation is performed for every imaging operation or the focusing operation is performed repeatedly, because the lens is moved by a motor during the focusing operation, electric current is increased and a battery life is shortened.

SUMMARY OF THE INVENTION

In view of the foregoing, it is an object of the invention to provide an imaging apparatus in which release time lag is shortened by not performing focusing operation again, in the case that the focused state is maintained after the focusing operation is performed once, and electric current is decreased to lengthen a battery life.

In order to achieve the above-described object of the invention, the imaging apparatus according to the invention comprises imaging means for converting an optical image imaged on an imaging surface into image data; focusing operation means for performing focusing operation which detects a focal position of a focus system lens focusing the optical image for every performance of focusing instruction manipulation and drives the focus system lens to the detected focal position; and decision means for comparing present image data which is obtained, according to the focusing instruction manipulation, before the performance of the focusing operation and immediately after the focusing instruction manipulation and in which the focus system lens is located at the last focal position detected by the last focusing operation with last image data which is obtained during the last focusing operation or immediately after the last focusing operation and in which the focus system lens is located at the last focal position, and decides whether or not a focused state since the last focusing operation is maintained.

In the structure, the imaging means converts an optical image imaged on an imaging surface into image data. The focusing operation means performs the focusing operation which detects the focal position of the focus system lens focusing the optical image for every performance of the focusing instruction manipulation, and drives the focus system lens to the detected focal position. The decision means compares the present image data which is obtained, according to the focusing instruction manipulation, before the performance of the focusing operation and immediately after the focusing instruction manipulation and in which the focus system lens is located at the last focal position detected by the last focusing operation with the last image data which is obtained during the last focusing operation or immediately after the last focusing operation and in which the focus system lens is located at the last focal position, and decides whether or not the focused state since the last focusing operation is maintained.

According to the structure described above, when the decision means decides that the focused state is maintained, the focusing operation can be shortened in the detection of the focused position by not driving the focus system lens or by narrowing a driving range of the focus system lens.

In an embodiment of the invention, the focusing operation means further comprises: normal focusing operation means for driving the focus system lens in a normal range and detecting the focal position of the focus system lens on the basis of image data sampled during the drive; shortened focusing operation means for detecting the last focal position as the focal position; and control means for starting the focusing operation by the normal focusing operation means when the decision means decides that the focused state since the last focusing operation is not maintained, and starting the focusing operation by the shortened focusing operation means when the decision means decides that the focused state since the last focusing operation is maintained.

In the structure, the normal focusing operation means drives the focus system lens in the normal range and detects the focal position of the focus system lens on the basis of the image data sampled during the drive. The shortened focusing operation means detects the last focal position as the focal position. The control means starts the focusing operation by the normal focusing operation means when the decision means decides that the focused state since the last focusing operation is not maintained, and starts the focusing operation by the shortened focusing operation means when the decision means decides that the focused state since the last focusing operation is maintained. Accordingly, in the focusing operation by the shortened focusing operation means, it is not necessary to drive the focus system lens, thus shortening focusing operation.

In another embodiment, the focusing operation means further comprises: normal focusing operation means for driving the focus system lens in the normal range and detecting the focal position of the focus system lens on the basis of the image data sampled during the drive; shortened focusing operation means for driving the focus system lens in a range near the last focal position and a shortened range which is narrower than the normal range and detecting the focal position of the focus system lens on the basis of image data sampled in the drive; and control means for starting the focusing operation by the normal focusing operation means when the decision means decides that the focused state since the last focusing operation is not maintained, and starting the focusing operation by the shortened focusing operation means when the decision means decides that the focused state since the last focusing operation is maintained.

According to the structure, the normal focusing operation means drives the focus system lens in the normal range and detects the focal position of the focus system lens on the basis of image data sampled during the drive. The shortened focusing operation drives the focus system lens in the range near the last focal position and the shortened range which is narrower than the normal range, and detects the focal position of the focus system lens on the basis of the image data sampled during the drive. The control means starts the focusing operation by the normal focusing operation means when the decision means decides that the focused state since the last focusing operation is not maintained, and starts the focusing operation by the shortened focusing operation means when the decision means decides that the focused state since the last focusing operation is maintained. Accordingly, in the focusing operation by the shortened focusing operation means, it is not necessary to drive the focus system lens, shortening focusing operation.

The decision means decides that the focused state is maintained, when the difference between an evaluation value obtained from the present image data and an evaluation value obtained from the last image data is in a predetermined range.

According to the structure, the decision means decides that the focused state is maintained, when the difference between the evaluation value obtained from the present data and the evaluation value obtained from the last image data is in the predetermined range. It is possible to perform easy decision by making the decision based on the evaluation value obtained from the image data, which is not the image data itself.

The evaluation value is an integral value of brightness difference in adjacent pixels in the image data or an integral value of a predetermined frequency band included in the image data.

The evaluation value is the integral value of the brightness difference in the adjacent pixels in the image data or the integral value of the predetermined frequency band included in the image data.

Generally, the focal position of the focus system lens is often detected by using the integral value of the brightness difference in the adjacent pixels in the image data or the integral value of the predetermined frequency band included in the image data. Accordingly, by using the integral value of the brightness difference in the adjacent pixels in the image data or the integral value of the given high frequency band included in the image data as the evaluation value, the decision can be made by using the same evaluation value as that in the detection of the focal position.

Even if the evaluation value difference is in a first predetermined range, the decision means decides that the focused state is not maintained, when brightness value difference between a subject brightness value obtained from the present image data and a subject brightness value obtained from the last image data exceeds a second predetermined range.

Further, even if the evaluation value difference is in the first predetermined range, the decision means decides that the focused state is not maintained, when the brightness value difference between the subject brightness value obtained from the present image data and the subject brightness value obtained from the last image data exceeds the second predetermined range. Accordingly, even if the evaluation value difference is in the first predetermined range, when the difference between the subject brightness value of the present image data and the subject brightness value of the last image data is out of the predetermined range, focusing on that there is a possibility that the focused state is not maintained, the precise decision can be made in such a manner that the decision is made by further using the subject brightness value obtained from the present image data or the last image data.

Further, even if the evaluation value difference is in the first predetermined range, when subject color difference between a subject color obtained from the present image data and a subject color obtained from the last image data exceeds a third predetermined range, the decision means decides that the focused state is not maintained.

Even if the evaluation value difference is in the first predetermined range, when the subject color difference between the subject color obtained from the present image data and the subject color obtained from the last image data exceeds the third predetermined range, the decision means decides that the focused state is not maintained. Accordingly, even if the evaluation value difference is in the first predetermined range, when the subject color difference between the subject color obtained from the present image data and the subject color obtained from the last image data is out of the predetermined range, focusing on that there is the possibility that the focused state is not maintained, the precise decision can be made in such a manner that the decision is made by further using the subject color obtained from the present image data or the last image data.

The decision means further obtains the evaluation value difference on the basis of an average value of an evaluation value which is calculated from plural items of present image data obtained by the plural number of samplings immediately after the focusing instruction manipulation and an average value of an evaluation value which is calculated from plural items of last image data obtained by the plural number of samplings immediately after the last focusing operation is finished.

The decision means obtains the evaluation value difference on the basis of the average value of the evaluation value which is calculated from the plural items of present image data obtained by the plural number of samplings immediately after the focusing instruction manipulation and the average value of the evaluation value which is calculated from the plural items of last image data obtained by the plural number of samplings immediately after the last focusing operation is finished. The image data includes a noise component caused by an electric noise, a change in a light source of the subject, or the like. The noise component subtly varies the evaluation value. Accordingly, influence of the noise component can be decreased to make the precise decision in such a manner that decides on the basis of the evaluation values which are sampled more than once.

The decision means obtains the brightness value difference on the basis of an average value of a subject brightness value which is calculated from plural items of present image data obtained by the plural number of samplings immediately after the focusing instruction manipulation and an average value of a subject brightness value which is calculated from plural items of last image data obtained by the plural number of samplings immediately after the last focusing operation is finished.

According to the structure, the decision means obtains the brightness value difference on the basis of the average value of the subject brightness value which is calculated from the plural items of present image data obtained by the plural Dumber of samplings immediately after the focusing instruction manipulation and the average value of the subject brightness value which is calculated from the plural items of last image data obtained by the plural number of samplings immediately after the last focusing operation is finished. The image data includes the noise component caused by the electric noise, the change in the light source of the subject, or the like. The noise component subtly varies the subject brightness value. Accordingly, the influence of the noise component can be decreased to make the precise decision in a manner that decides on the basis of the subject brightness values which are sampled more than once.

The decision means further obtains the subject color difference on the basis of the average value of the subject color which is calculated from the plural items of present image data obtained by the plural number of samplings immediately after the focusing instruction manipulation and the average value of the subject color which is calculated from the plural items of last image data obtained by the plural number of samplings immediately after the last focusing operation is finished.

According to the structure, the decision means obtains the subject color difference on the basis of the average value of the subject color which is calculated from the plural items of present image data obtained by the plural number of samplings immediately after the focusing instruction manipulation and the average value of the subject color which is calculated from the plural items of last image data obtained by the plural number of samplings immediately after the last focusing operation is finished. The image data includes the noise component caused by the electric noise, the change in the light source of the subject, or the like. The noise component subtly varies the subject color. Accordingly, the influence of the noise component can be decreased to make the precise decision in such a manner that decides on the basis of the subject color values which are sampled more than once.

In still another embodiment, the imaging apparatus further comprises starting means for controlling the focusing operation means to start the focusing operation according to imaging instruction manipulation after an imaging mode in which the optical image can be taken is set.

According to the structure, the imaging apparatus further comprises starting means for controlling the focusing operation means to start the focusing operation according to imaging instruction manipulation after an imaging mode in which the optical image can be taken is set. Accordingly, even in the case that the focusing instruction manipulation is performed for the first time since the imaging mode is set, the decision whether the focused state since the setting is maintained or not can be made by starting the focusing operation after the imaging mode in which the optical image can be taken is set.

BRIEF DESCRIPTION OF THE DRAWINGS

FIG. 2 is a flow chart showing a procedure of a CPU constituting the camera of FIG. 1.

DETAILED DESCRIPTION OF THE PREFERRED EMBODIMENTS

Figure 1:
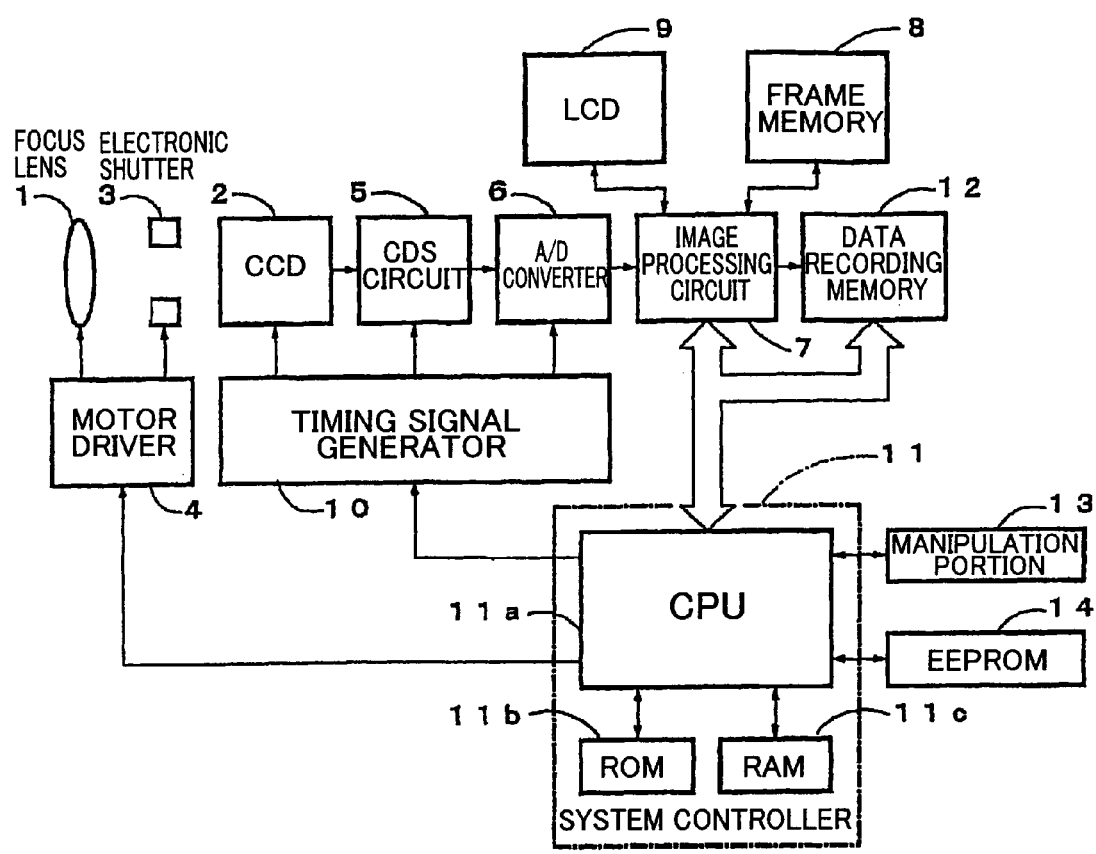
FIG. 1 is a block diagram showing an embodiment of a camera as an imaging apparatus according to the invention.

Preferred embodiments of the invention will be described below in connection with the accompanying drawings.

As shown in FIG. 1, subject light is incident to an imaging element (hereinafter referred to as "CCD") 2 through a focus lens 1. The focus lens 1 (focusing system lens) is one which adjusts a focal point of a subject image by movement in an optical axis direction. An electronic shutter 3 is placed between the focus lens 1 and the CCD 2, quantity of light incident to an imaging surface is limited by the electronic shutter 3. The focus lens 1 and electronic shutter 3 are driven by a motor driver 4.

The above-described CCD 2 (imaging means) has the imaging surface in which a plurality of pixels performing photoelectric conversion is arranged in the shape of a two-dimensional matrix. When the subject light is incident to the imaging surface, the CCD 2 converts an optical image focused on the imaging surface into an electric signal to output it as analog image data.

A noise component in the image data outputted from the CCD 2 is removed by a CDS circuit 5, the image data is converted into a digital value by an A/D converter 6, and then the image data is outputted to an image processing circuit 7. By using a frame memory 8 storing temporarily the image data, the image processing circuit 7 performs various kinds of image processing such as compression/expansion processing, and displays the image-processed image data on a liquid crystal display 9 (hereinafter referred to as "LCD 9").

In the CCD 2, the CDS circuit 5, and the A/D converter 6, timing of conversion or timing of removal is controlled through a timing signal generator 10 generating a timing signal by a system controller 11.

The system controller 11 performs the control of the whole camera. The system controller 11 includes a CPU 11a processing various kinds of calculation according to a program, a ROM 11b of a read-only memory storing the program used by the CPU 11a and the like, a work area used in various kinds of procedures by the CPU 11a, and a RAM 11c capable of reading and writing memory having a data storage area storing various kinds of data, and those components of the system controller 11 are connected by a bass line which is not shown.

A data recording memory 12 storing the image data outputted from the image processing circuit 7, a manipulation portion 13 having a release switch in which imaging/focusing instruction manipulation is performed, and an EEPROM 14 storing various kinds of set values are connected to the system controller 11.

The general operation of the camera having the structure described above will be described below.

When the imaging mode in which the optical image can be taken by the CCD 2 is set by the operation of a power switch or a mode selector switch, the CCD 2 sends the image data, which is obtained by the photoelectric conversion of the optical image imaged on the imaging surface, to the image processing circuit 7 through the CDS circuit 5 and the A/D converter 6 in every 1/30 second. The image data sent from the CCD is trichromatically (R, G, B) separated by the image processing circuit 7 and stored in the frame memory 8. An evaluation value calculating portion (not shown) provided in the image processing circuit 7 calculates a subject brightness value in the imaging data as an AE evaluation value, the integral value of a high frequency component or the integral value of brightness difference in the adjacent pixels in the image data as an AF evaluation value, and a subject color in the image data as an AWB evaluation value respectively, whenever the image data is sent. Each of the calculated evaluation values is taken into the CPU 11a, and then, the CPU 11a controls the motor driver 4 according to the AE evaluation value to perform automatic exposure operation, and controls the image processing circuit 7 according to the AWE evaluation value to perform the control such as auto white balance adjustment operation.

The image data stored in the frame memory 8 is read again in the image processing circuit 7, YUV-converted by a YUV conversion portion (not shown) provided in the image processing circuit 7, and written in the frame memory 8. The YUV-converted image data is sent to the LCD 9 through the image processing circuit 7 and displayed on the LCD 9. This process is repeated every 1/30 second.

When the imaging instruction manipulation in the manipulation portion 13 is performed, the AF operation is normally started in such a manner that the CPU 11a synchronizes with a transmission period of the imaging data sent by the CCD 2 and drives the focus lens 1 through the motor driver 4. The CPU 11a drives the focus lens 1 from a point-blank distance to the infinite distance as a total ranging object range or from the infinite distance to the point-blank distance, and reads the AF evaluation value of the image data sent to the image processing circuit 7 during the drive of the focus lens 1. Then, the CCD 11a detects a position of the focus lens 1 where the read AF evaluation value becomes a maximum as the focal position, drives the focus lens 1 to the focal position through the motor driver 4, and finishes the normal AF operation.

The image data, which is sent from the CCD 2 after the AF operation is finished, is stored in the frame memory 8 through the CDS circuit 5, the A/D converter 6, and the image processing circuit 7. At this point, the image data stored in the frame memory 8 is read again into the image processing circuit 7, YUV-converted, and written in the frame memory 8.

In imaging, the YUV-converted image data is sent to an image compression/expansion circuit (not shown) in the image processing circuit 7. The YUV-converted image data sent to the image compression/expansion circuit is compressed and written in the frame memory 8. The compressed image data in the frame memory 8 is read through the image processing circuit 7 and stored in a memory 12 for recording data.

Next the operation of the camera as the imaging apparatus of the invention will be described referring to a flow chart showing the procedure of the CPU 11a in FIG. 2.

When the above-described imaging mode is set by the timing such as turning power switch on, the CPU 11a serves as the starting means and the normal focusing operation means, and immediately starts the normal AF operation (step S1).

After the normal AF operation is finished, the CPU 11a obtains the AF evaluation value, which is calculated in the evaluation value calculating portion of the image processing circuit 7, more than once whenever the image data is sent from the CCD 2, and stores its average value in a last AF evaluation value area formed in the RAM 11c (step S2). In the same way, the CPU 11a obtains the AE evaluation value and the AWB evaluation value more than once, and stores respectively their average values in a last AE evaluation value area and a last AWB evaluation value area, which are formed in the RAM 11c (steps S3 and S4). The image data sent from the CCD 2 after the AF operation is finished corresponds to the last image data.

If decision that the imaging/focusing instruction manipulation has been performed is made, pressing the release switch of an operating portion 13 (YES in step S5 of requesting image), the CPU 11a obtains the evaluation value of AF calculated in the calculating portion of evaluation value of the image processing circuit 7 more than once whenever the image data is sent from the CCD 2, and stores its average value in a present AF evaluation value area formed in the RAM 11c (step S6). Then, the CPU 11a compares the AF evaluation value stored in the last AF evaluation value area to that stored in the present AF evaluation value area (step S7), if an absolute value of the difference is not more than α of a predetermined value (YES in step S7), making the decision that a possibility that a focused state since the last AF operation is maintained is high, the operation proceeds to the next step S8.

On the other hand, if the absolute value of the difference is more than α (NO in step S7), making the decision that the focusing state from the last AF operation is not maintained, a driving step number of the focus lens 1 in the AF operation is set to an M step (step S13 showing step number for scanning AF). α and M are values which are previously set, for example, those values are stored in the EEPROM 14 in FIG. 1 and read if necessary.

In the step S8, the CPU 11a obtains the AE evaluation value more than once and stores its average value in a present AE evaluation value area formed in the RAM 11c.

Then, the CPU 11a compares the AE evaluation value stored in the last AE evaluation value area to that stored in the present AE evaluation value area (step S9), if an absolute value of the difference is not more than β of a predetermined value (YES in step S9), making the decision that the possibility that the focused state since the last AF operation is maintained is high, the operation proceeds to the next step S10. On the other hand, if the absolute value of the difference is more than β (NO in step S9), even though the difference of the AF evaluation value is not more than α, making the decision that the focused state since the last AF operation is not maintained, the operation proceeds to the step S13. β is a value which is also previously stored in the EEPROM 14.

In the step S10, the CPU 11a obtains the AWB evaluation value more than once and stores its average value in a present AWB evaluation value area formed in the RAM 11c. Then, the CPU 11a compares the AWB evaluation value stored in the last AWB evaluation value area to that stored in the present AWB evaluation value area (step S11), if an absolute value of the difference is not more than γ of a predetermined value (YES in step S11), making the decision that the focused state since the last AF operation is maintained, the driving step number of the focus lens 1 in the AF operation is set to an N step (step S12 showing step number for scanning AF), if the absolute value of the difference is more than γ (NO in step S11), even though the difference of the AF evaluation value is not more than α, making the decision that the focused state since the last AF operation is not maintained, a step number for driving is set to the M step (step S13 showing step number for scanning AF). γ and N are values which are also previously stored in the EEPROM 14. Relationship between the driving step numbers M and N is M>N. M is the driving step number which scans the total ranging object range.

The image data which are the base of evaluation values obtained in the steps S6, S8, and S10, which are performed after the imaging/focusing instruction operation, corresponds to the present image data in claims of the invention. In the steps S7, S9, and S11, it is found that the CPU 11a serves as the decision means in claims.

Then, the CPU 11a serves as focusing operation means, drives the focus lens 1 by the step number for driving set in the step S12 or the step S13, detects the focal position on the basis of the AF evaluation value of the image data sent to the image processing circuit 7 during the drive of the focus lens 1, and performs the AF operation in which the driving motor 1 is driven to the detected focal position through the motor driver 4. However, when the driving step number is N, the focus lens 1 is driven in the range where the focal position detected by the last AF operation is centered.

Then, the CPU 11a performs the execute operation of the image data in the memory for recording data 12 (step S15). The CPU 11a obtains again the AF, AE, and AWB evaluation values (steps S2 to 84), and come into a standby state till a next imaging request.

According to the camera having the structure described above, in the case that the decision that the focused state since the last AF operation is not maintained is made and the driving step number is set to M, the CPU 11a serves as the normal focusing operation means, and drives the focus lens 1 in the normal range of the total ranging subject range, while the normal AF operation in which the AF evaluation value is sampled is performed.

On the other hand, in the case that the decision that the focused state since the last AF operation is maintained is made and the driving step number is set to N, the CPU 11a serves as the shortened focusing operation means, and drives the focus lens 1 in the shortened range in which the last focal position is centered and which is narrower than the normal range, while the shortened AF operation in which the AF evaluation value is sampled is performed.

Accordingly, when the focused state is maintained, the AF operation can be shortened, release time lag can be shortened, and electric current consumption can be reduced to lengthen a battery life. When the driving step number is set to M, the normal AF operation is performed, when the driving step number is set to N, the shortened AF operation is performed, so that it is found that the CPU 11a serves as the control means in the steps S12 and S13.

In the above-described embodiment, focusing on that the focused state is often not maintained by changing the subject and the like in the case that the subject brightness in the image data is changed or the subject color is changed, in addition to the AF evaluation value, the decision whether the focused state is maintained or not is made on the basis of the AE and AWB evaluation values. Thus, the decision whether the focused state is maintained or not is made on the basis of the AF, AE, and AWB evaluation values, and the precise decision of the focus can be made.

According to the above-described camera, the normal AF operation is started immediately after the imaging mode is set. Consequently, because the decision whether the focused state is maintained since the setting or not can be made, even in the case that the focusing instruction manipulation is performed for the first time after the imaging mode is set, the AF operation can be shortened even if the focusing instruction manipulation is performed for the first time after the imaging mode is set.

Furthermore, according to the above-described camera, the decision whether the focused state is maintained since the setting or not is made on the basis of each evaluation value obtained more than once. Thus, the precise decision can be made in a manner that removes the influence of the noise component in the image data.

In the embodiment, even in the case that the decision that the focused state is maintained is made, the focus lens 1 is driven but the range is narrower than the normal range. However, for example, it is also thought that the present position is detected as the focal position and the shortened AF operation holding the focus lens 1 at the present position is performed without driving the focus lens 1. Thus, it is not necessary to drive the focus lens 1 in the AF operation, the AF operation is shortened to reduce the release time lag, and the electric current consumption can be reduced to lengthen a battery life.

In the embodiment, the AF evaluation value obtained after the AF operation is finished is stored in the last AF evaluation value area. However, focusing on that the AF evaluation value is obtained during the AF operation, the AF evaluation value which is a maximum among the AF evaluation values obtained during the AF operation, namely the AF evaluation value when the focus lens 1 is located at the focused position, may be stored in the last AF evaluation value area.

As described above, according the invention, when the decision means decides that the focused state is maintained, since the focusing operation can be shortened in the detection of the focused position by not driving the focus system lens or narrowing a driving range of the focus system lens, as a result, the release time lag can be shortened and the electric current consumption can be reduced to lengthen a battery life.

Since it is not necessary to drive the focus system lens in the focusing operation, the focusing operation can be shortened, consequently, the release time lag can be shortened and the electric current consumption can be reduced to lengthen a battery life.

In the focusing operation by the shortened focusing operation means, because the focus system lens may be driven in narrower range than that in the focusing operation by the normally focusing operation means, the focusing operation can be shortened, as a result, the release time lag can be shortened and the electric current consumption can be reduced to lengthen a battery life.

Furthermore, by making the decision on the basis of not the image data itself but the evaluation value obtained from the image data, the decision can be easily made.

By using the integral value of the brightness difference in the adjacent pixels in the image data or the integral value of the given high frequency band included in the image data as the evaluation value, the evaluation value can be easily obtained, because the decision can be made by using the same evaluation value as that in the detection of the focal position.

Even if the evaluation value difference is in the first predetermined range, when the difference between the subject brightness value of the present image data and the subject brightness value of the last image data is out of the predetermined range, focusing on that there is the possibility that the focused state is not maintained, the precise decision can be made in such a manner that the decision is made by further using the subject brightness value obtained from the present image data or the last image data.

Even if the evaluation value difference is in the first predetermined range, when the difference between the subject color of the present image data and the subject color of the last image data is out of the predetermined range, focusing on that there is the possibility that the focused state is not maintained, the precise decision can be made in such a manner that the decision is made by further using the subject color obtained from the present image data or the last image data.

By making the decision on the basis of the evaluation values which are sampled more than once, the influence of the noise component is decreased, and the imaging apparatus being able to make the precise decision can be obtained.

By making the decision on the basis of the subject brightness values which are sampled more than once, the influence of the noise component is decreased, and the precise decision can be made.

By making the decision on the basis of the subject color values which are sampled more than once, the influence of the noise component is reduced, and the precise decision can be made.

Even in the case that the focusing instruction manipulation is performed for the first time since the imaging mode is set, since the decision whether the focused state since the setting is maintained or not can be made by starting the focusing operation after the imaging mode in which the optical image can be taken is set, the focusing operation can be shortened even in the case that the focusing instruction manipulation is performed for the first time since the imaging mode is set.

What is claimed is:

1. An imaging apparatus comprising:
   imaging means for converting an optical image imaged on an imaging surface into image data;
   focusing operation means for performing a focusing operation that detects a focal position of a focus system lens focusing the optical image for every performance of focusing instruction manipulation and drives the focus system lens to the detected focal position; and
   decision means for comparing an evaluation value obtained from present image data with an evaluation value obtained from last image data obtained when the focus system lens was located at a focal position in a last focusing operation and deciding whether or not a focused state in which the focus system lens is focused is maintained, according to the focusing instruction manipulation without driving the focus system lens, and
   when the decision means determines that the focused state is not maintained, the focusing operation means performs the focusing operation.

2. An imaging apparatus according to claim 1, wherein said focusing operation means comprises:
   normal focusing operation means for driving the focus system lens in a normal range and detecting the focal position of the focus system lens on the basis of an evaluation value obtained from image data sampled during the drive;
   shortened focusing operation means for detecting the last focal position as the focal position; and
   control means for starting the focusing operation by the normal focusing operation means when the decision means decides that the focused state is not maintained, and starting the focusing operation by the shortened focusing operation means when the decision means decides that the focused state is maintained.

3. An imaging apparatus according to claim 1, wherein said focusing operation means comprises:
   normal focusing operation means for driving the focus system lens in a normal range and detecting the focal position of the focus system lens on the basis of an evaluation value obtained from image data sampled during the driving;
   shortened focusing operation means for driving the focus system lens in a range near the last focal position and in a shortened range that is narrower than the normal range, and detecting the focal position of the focus system lens on the basis of an evaluation value obtained from image data sampled during the driving; and
   control means for starting the focusing operation by the normal focusing operation means when the decision means decides that the focused state is not maintained, and starting the focusing operation by the shortened focusing operation means when the decision means decides that the focused state is maintained.

4. An imaging apparatus according to claim 1, wherein said decision means decides that the focused state is maintained, when an evaluation value difference between the evaluation value obtained from the present image data and the evaluation value obtained from the last image data is in a first predetermined range.

5. An imaging apparatus according to claim 1, wherein said evaluation value is an integral value of brightness difference in adjacent pixels in the image data or an integral value of a predetermined frequency band included in the image data.

6. An imaging apparatus according to claim 4, wherein even if the evaluation value difference is in the first predetermined range, said decision means decides that the focused state is not maintained, when brightness value difference between a subject brightness value obtained from the present image data and a subject brightness value obtained from the last image data exceeds a second predetermined range.

7. An imaging apparatus according to claim 4, wherein even if the evaluation value difference is in the first predetermined range, when subject color difference between a subject color obtained from the present image data and a subject color obtained from the last image data exceeds a third predetermined range, the decision means decides that the focused state is not maintained.

8. An imaging apparatus according to claim 4, wherein the decision means obtains the evaluation value difference on the basis of an average value of an evaluation value that is calculated from plural items of present image data obtained by plural number of samplings immediately after the focusing instruction manipulation and an average value of an evaluation value that is calculated from plural items of last image data obtained by the plural number of samplings immediately after the last focusing operation is finished.

9. An imaging apparatus according to claim 6, wherein the decision means obtains the brightness value difference on the basis of an average value of a subject brightness value that is calculated from plural items of present image data obtained by plural number of samplings immediately after the focusing instruction manipulation and an average value of a subject brightness value that is calculated from plural items of last image data obtained by plural number of samplings immediately after the last focusing operation is finished.

10. An imaging apparatus according to claim 7, wherein the decision means obtains the subject color difference on the basis of an average value of a subject color that is calculated from plural items of present image data obtained by plural number of samplings immediately after the focusing instruction manipulation and an average value of a subject color that is calculated from plural items of last image data obtained by the plural number of samplings immediately after the last focusing operation is finished.

11. An imaging apparatus according to claim 1, further comprising starting means for controlling the focusing operation means to start the focusing operation according to imaging instruction manipulation, after an imaging mode in which the optical image can be taken is set.

* * * * *